(12) United States Patent
Truyen et al.

(10) Patent No.: US 7,454,044 B2
(45) Date of Patent: Nov. 18, 2008

(54) VOLUME VISUALIZATION USING TISSUE MIX

(75) Inventors: Roel Truyen, Eindhoven (NL); Steven Lobregt, Eindhoven (NL); Iwo Willem Oscar Serlie, Delft (NL)

(73) Assignee: Koninkklijke Philips Electronics, N.V., Eindhoven (NL)

(*) Notice: Subject to any disclaimer, the term of this patent is extended or adjusted under 35 U.S.C. 154(b) by 309 days.

(21) Appl. No.: 10/545,654

(22) PCT Filed: Feb. 18, 2004

(86) PCT No.: PCT/IB2004/050129

§ 371 (c)(1),
(2), (4) Date: Aug. 15, 2005

(87) PCT Pub. No.: WO2004/075117

PCT Pub. Date: Sep. 2, 2004

(65) Prior Publication Data

US 2006/0222219 A1    Oct. 5, 2006

(30) Foreign Application Priority Data

Feb. 18, 2003    (EP) ................................. 03100373

(51) Int. Cl.
*G06K 9/00* (2006.01)

(52) U.S. Cl. ..................... 382/128; 382/100; 382/232; 382/240; 600/315; 607/14

(58) Field of Classification Search ............... 382/103, 382/100, 232, 240, 128; 600/315; 607/14
See application file for complete search history.

(56) References Cited

U.S. PATENT DOCUMENTS

| | | | |
|---|---|---|---|
| 5,068,788 A | 11/1991 | Goodenough et al. | |
| 6,324,240 B1 | 11/2001 | Yan et al. | |
| 6,483,507 B2 * | 11/2002 | Osborne et al. | 345/419 |

(Continued)

FOREIGN PATENT DOCUMENTS

EP    1001380 A2    5/2000

(Continued)

OTHER PUBLICATIONS

☐☐Kniss, et al: Interactive Volume Rendering Using Multi-Dimensional Transfer Functions and Direct Manipulation Widgets, IEEE Visualization, Oct. 2001, pp. 255-262.*

(Continued)

*Primary Examiner*—Andrew W. Johns
*Assistant Examiner*—Nancy Bitar (57) ABSTRACT

A method is presented to calculate the relative contribution of different tissues, or tissue mix, to at least one data element in a medical object data set, the medical object data set containing data elements, the data elements assigning data values to respective positions in a multi-dimensional geometrical space containing more than one tissue, by means by which parameters are calculated for the at least one data element, the parameters being dependent on the data value of the at least one data element and data values of surrounding data elements in the neighborhood of the at least one data element, the parameters being further compared to combinations of said parameters for data elements occurring in the region of boundaries between tissues.

11 Claims, 6 Drawing Sheets

U.S. PATENT DOCUMENTS

| | | | |
|---|---|---|---|
| 6,687,393 B1* | 2/2004 | Skinner, Jr. | 382/131 |
| 7,039,723 B2* | 5/2006 | Hu et al. | 709/248 |
| 2006/0143215 A1* | 6/2006 | Truyen et al. | 707/102 |

FOREIGN PATENT DOCUMENTS

WO     2002067201 A1     8/2002

OTHER PUBLICATIONS

☐☐D. C. Williamson, et al: Partial Volume Tissue Segmentation Using Grey-Level Gradient, Presented at MIUA on May 22, 2002.*
Partial Volume tissue segmentation using grey-level gradient, william et al.*
ISR: PCT/IB04/050129.
Written Opinion: PCT/IB04/050129.
Iwo Serlie et al; "Computed Cleansing for Virtual Colonoscopy Using a Three-Material Transition Model", Pattern Recognition Group, Delft Univ of Tech.Lorenzweg, NL,.
D. C. Williamson et al; "Partial Volume Tissue Segmentation Using Grey-Level Gradient", Tina Memo No. 2002-006, Imaging Science and Biomedical Eng. Division, University of Manchester., May 22, 2002.
G. De Vries; "Thickness Measurement of CT-Imaged Objects", Pattern Recognition Group, Faculty fo Applied Physics, Delft Univ. of Tech. Loreentzweg, NL.

* cited by examiner

VOLUME VISUALIZATION USING TISSUE MIX

The invention relates to a method to calculate the relative contribution of different tissues to at least one data element in a medical object data set, the medical object data set containing data elements, the data elements assigning data values to respective positions in a multi-dimensional geometrical space containing more than one tissue.

Tissue mix is known in the art, for example from "Partial Volume Tissue Segmentation using Grey-Level Gradient", D. C. Williamson, N. A. Thacker, S. R. Williams and M. Pokric, presented at MIUA 2002, which discloses a method for its calculation. The calculation of tissue mix can be used to solve the problem of partial volume effect, which is the misclassification of CT value in a voxel occurring at a boundary between different tissue types due to the contributions to that voxel from unknown proportions of surrounding tissue. The problem can occur whenever different tissues or materials meet at a boundary so can occur between, say, bone and soft tissue, but can also occur between regions of air and tissue in, say, the colon, and also between combinations such as air, liquid and different types of tissue. Unfortunately, this method as disclosed is not very robust to noise.

It is an object of the invention to provide an improved method to calculate tissue mix. This is achieved according to the object of the invention by which parameters are calculated for the at least one data element, which parameters are dependent on the data value of the at least one data element and data values of surrounding data elements in the neighborhood of the at least one data element, and further the parameters are compared to combinations of said parameters for data elements in the medical object data set which occur in the region of boundaries between tissues.

It can therefore be seen that the calculation of the different tissue contributions in a single voxel is effected by adding more measurements to the data volume. These measurements include the grey value gradient magnitude in a voxel and in a neighborhood around the voxel, the average grey value in a number of neighborhoods around the voxel, each with a different size (multiscale approach), and fitting the various values of grey value and gradient measured to a model of the expected behavior for certain types of tissue transitions, and using the optimal model and goodness-of-fit as measures.

This can be further explained using, as example, a 3 tissue type partition offering a range of intensity values from high intensity to low intensity. For ease of clarity, the three tissue types chosen are air, soft tissue and contrast enhanced stool. Methods of calculating tissue mix start with some sort of assumption about the information in the object data set. The assumption on which the invention is based is that an edge, or boundary between two tissue types, looks like an e.g. Gaussian smoothed step edge between 2 materials each with constant grey value.

For a tissue transition, a model is made of how the grey values and grey value derivatives, usually indicated as the gradient magnitude, vary when crossing an edge in the direction of the gradient This is done by sampling both the grey value and gradient value along the direction of the maximum gradient and plotting these to produce a graph of grey value-gradient magnitude relation. This model gives us an expected behavior of the measurements near the different transitions, and will be a great help in robustly determining any transition in a voxel between one tissue type and another. Such plots can be made for all tissue transitions in an image.

In a 3 tissue type partition there are 3 different transitions possible between any 2 of the 3 different tissue types. These are the boundary between tissue types 1 and 2, the boundary between tissues types 2 and 3 and the boundary between tissue types 1 and 3. The grey values are sampled along the gradient direction across the boundaries in the image, this gradient direction being orthogonal to the separating surface. More sophisticated assumptions will lead to more complex models, but do not modify the general idea of this method of calculating tissue mix. The method can further be generalized to junctions between 3 tissues, or transitions between more than 3 tissues.

Using the model as described above any voxel can now be classified as belonging to one of the 3 transitions. For every voxel in the image, the direction of the gradient is determined and sample the grey values and gradient magnitudes along that direction. We determine the parameters of the model that best corresponds to the samples near the voxel and in doing so are able to place any voxel, and the voxels around it, on the correct portion of our grey value-gradient magnitude relation plots for the different tissue type boundaries.

Yet again, this allows us to separate out the voxels according to the particular tissue mix within that voxel and thereby solve the problem of partial volume effect.

These and other features of the invention will be explained using the following diagrams.

FIG. 2 depicts (a) CT value and (b) the gradient magnitude model, or A-curve, of a two-material transition.

FIG. 3 shows (a) profiles across tissue transitions with (b) corresponding A-curves.

FIG. 4 shows (a) a typical CT slice with (b) the corresponding constructed L H histogram of CT values.

FIG. 5 shows the calculation of tissue mix according to the invention with (a) a voxel situated on a boundary between two material types, and (b) the corresponding A-curve containing complimentary values of grey value and gradient.

FIG. 6 shows the invention applied to the three material transition in which (a) shows CT value, (b) shows gradient-magnitude and (c) shows the parachute shaped surface P of the gradient magnitude model for barycentric coordinates.

Figure 1:
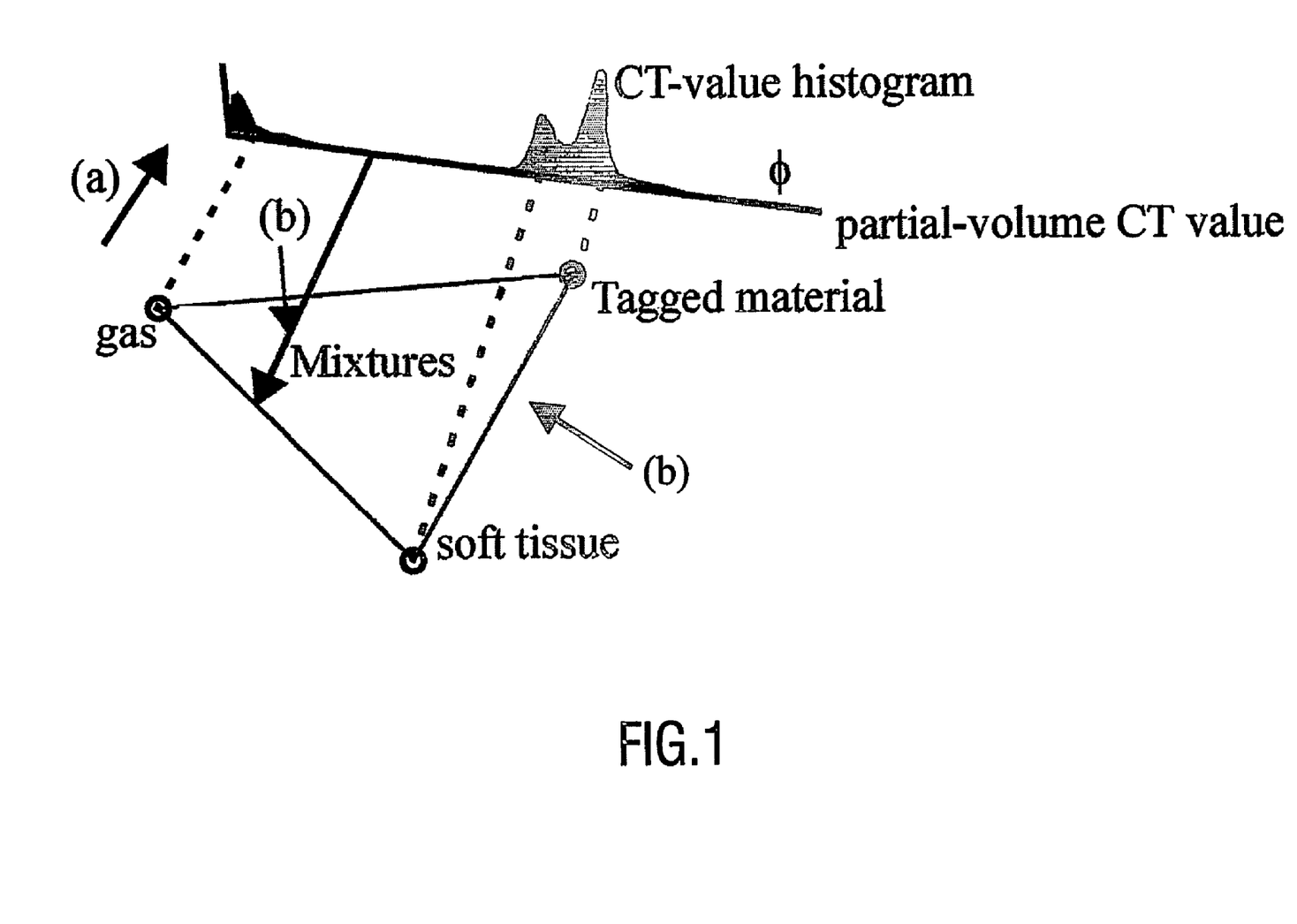
FIG. 1 shows (a) the projection of material mixtures on CT values, and (b) the back-projection of CT values.
Figures 2A, 2B:
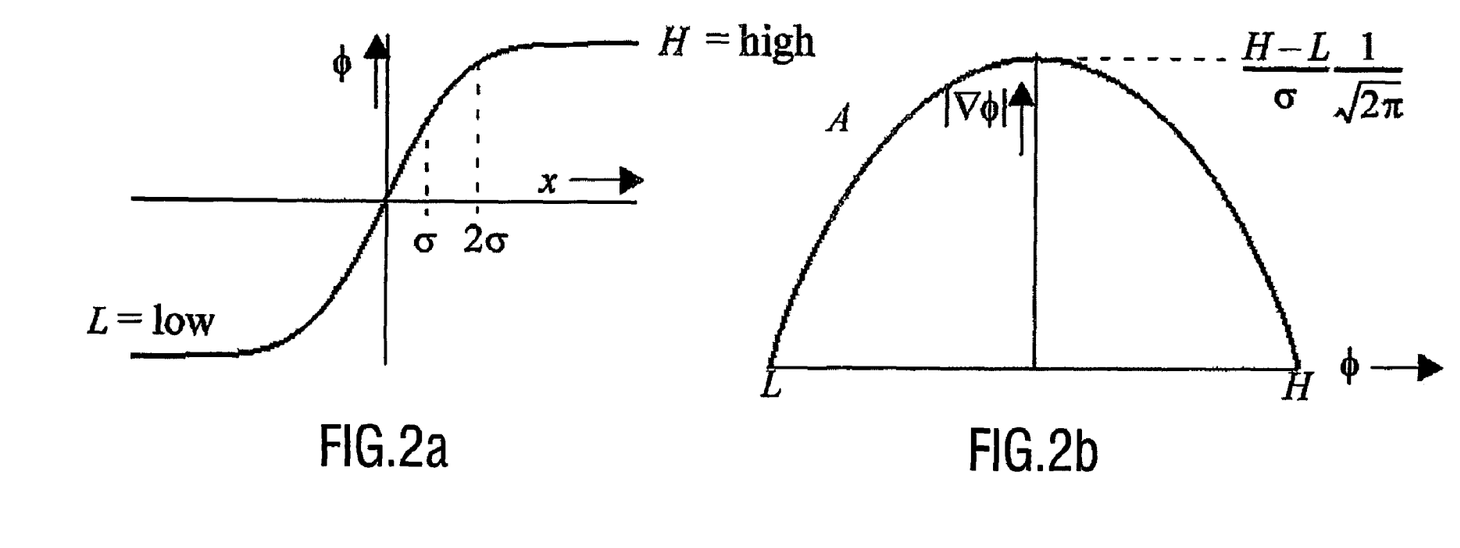

The method of the invention is described using application to a three tissue model in the colon. The partial volume effect can be thought of as follows. Let us assume three material types in a region around the colon surface, those types being gas, tissue and contrast-enhanced (tagged) material. A CT value $\phi$ in a voxel can be modeled as a linear combination of material contributions:

$$\phi = a \cdot \mu_g + b \cdot \mu_t + c \cdot \mu_c,$$

with the fraction a corresponding to gas, b to tissue and c to tagged material. These mixture fractions can be represented as barycentric positions in the triangle of FIG. 1b. During acquisition these material fractions are measured as single CT values. The invention allows us to perform the inverse operation, namely to determine material mixtures starting from the acquired CT values as shown in FIG. 1b and going to projection shown in FIG. 1a. A transition between two materials is modeled as a Gaussian smoothed step edge with variance $\sigma^2$ (the cumulative-Gaussian distribution). Let $\phi$ represent a CT value and $|\nabla \phi|$ the gradient-magnitude. Plotting $|\nabla \phi|$ as a function of $\phi$ yields an arch-shaped curve. Henceforth, it is referred to as the A-curve and is shown in FIG. 2b. The value $\phi$ is linearly dependent on material fractions.

The general definition of the Gaussian and the error function are given in the following equation:

$$g(x) = \frac{1}{2\pi} e^{\frac{-x^2}{2}}, \text{erf}(z) = \frac{1}{\sqrt{\pi}} \int_0^z e^{-t^2} dt$$

A closed formula of the A-curve is given here as:

$$A(\phi; (L, H, \sigma)) = \frac{H-L}{\sigma} g\left\{\sqrt{2} \, \text{erf}^{-1}\left(2\frac{\phi-L}{H-L} - 1\right)\right\}$$

and is defined with a limited number of parameters: two constant CT values at the step-edge, those values being L and H as shown in FIG. 2a and the σ of the Gaussian.

Figure 3A:
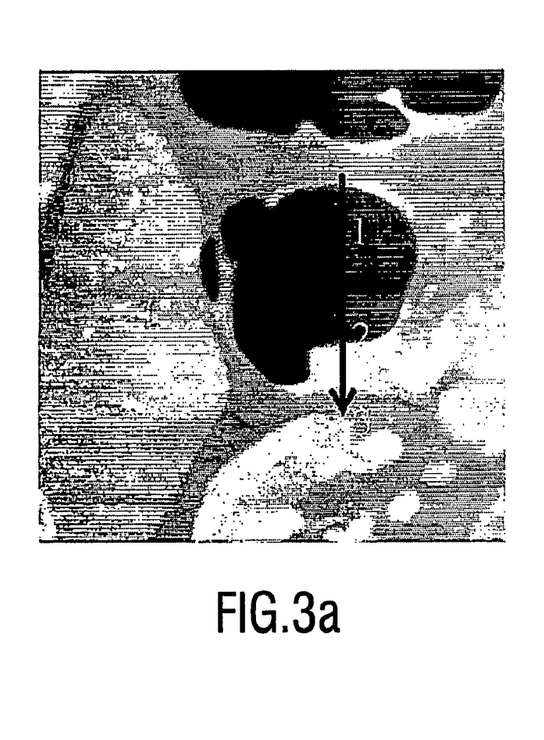
Figure 3B:
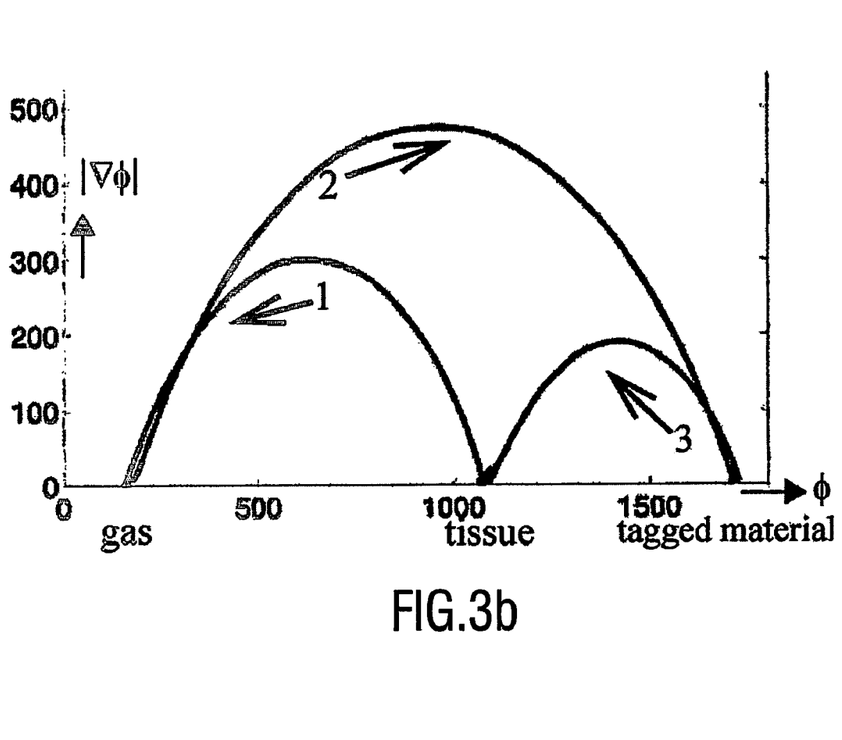

Focusing on the example profile crossing the three two-tissue transitions shown in FIG. 3a, it can be seen that progressing along the line from top to bottom, the position on the A-curves are traced. It can be seen that three A-curves occur as shown in FIG. 3b, one each at a transition between two types of tissue. Since there are three types of transitions in this example there are three such A-curves. In this case the three A-curves represent the grey value, φ, and gradient, |∇φ| combinations for voxels in the neighborhood of the boundaries between the tissue-gas transition, the gas-tagged material transition and the tagged material-tissue transition.

Figure 4A:
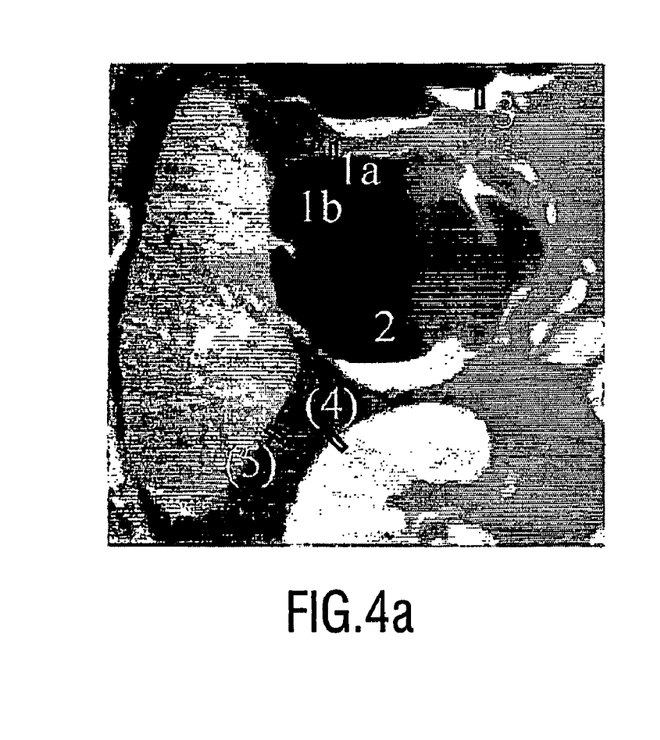
Figure 4B:
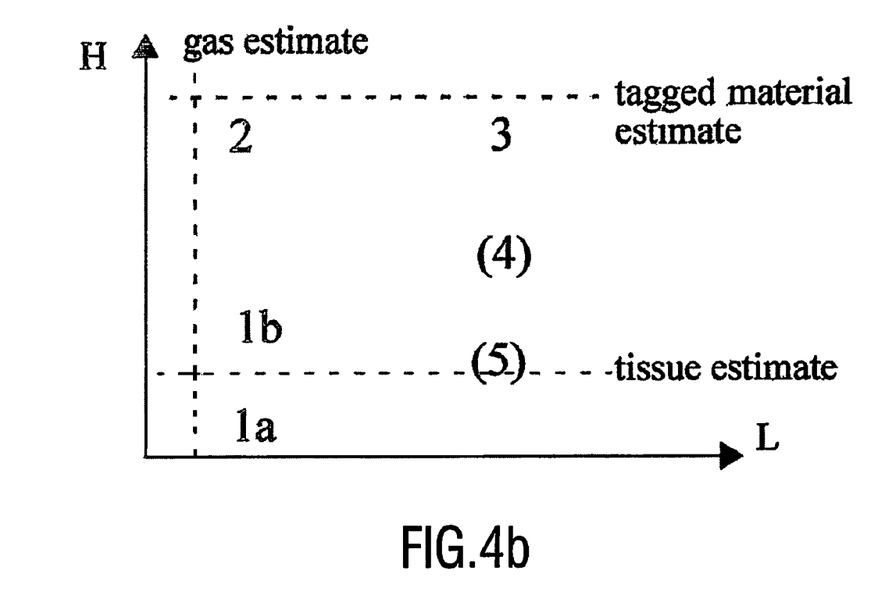

Three models are defined by choosing the values L and H that best fit the three types of transitions. These values can be determined by the following procedure.
1. For every voxel CT values of grey value, φ, and gradient, |∇φ|, are sampled in the direction of the gradient Note that for this invention we only need to sample in the immediate neighborhood of the transition.
2. Determine the A-curve parameters that best fit to these CT measurements and collect the L and H parameters in a 2-D histogram, as shown in FIG. 4b. The L-parameter is plotted on the horizontal axis and the H-parameter on the vertical axis. Partial volume values are not plotted because they do not occur near the A-curve φ-axis.
3. The average values of gas, tissue and contrast enhanced fluid are determined from the 2-D histogram of FIG. 4b. It can be seen by comparison with FIG. 4a that in the L-direction the first plotted area, 1a and 1b, corresponds to air. Restricting the range of values in the H-direction to this value, it can be seen that the area noted as 5 corresponds to tissue and the area noted as 3 corresponds to tagged material. The value of σ is estimated by averaging all A-curve σ estimates. It is assumed that the point spread function is isotropic.

Figure 5A:
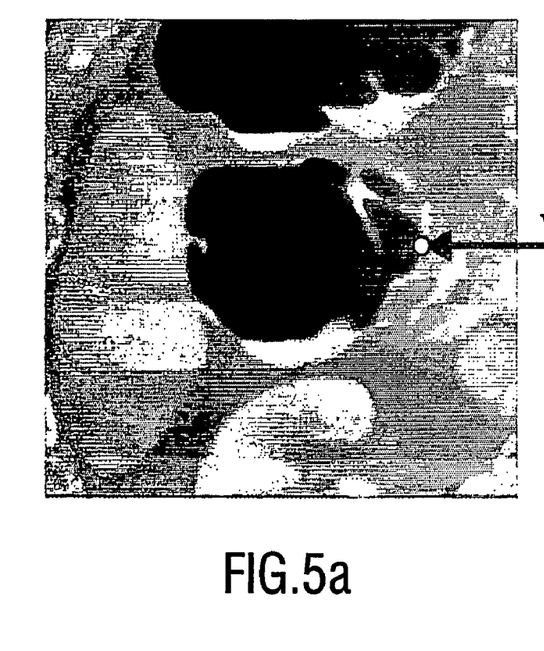
Figure 5B:
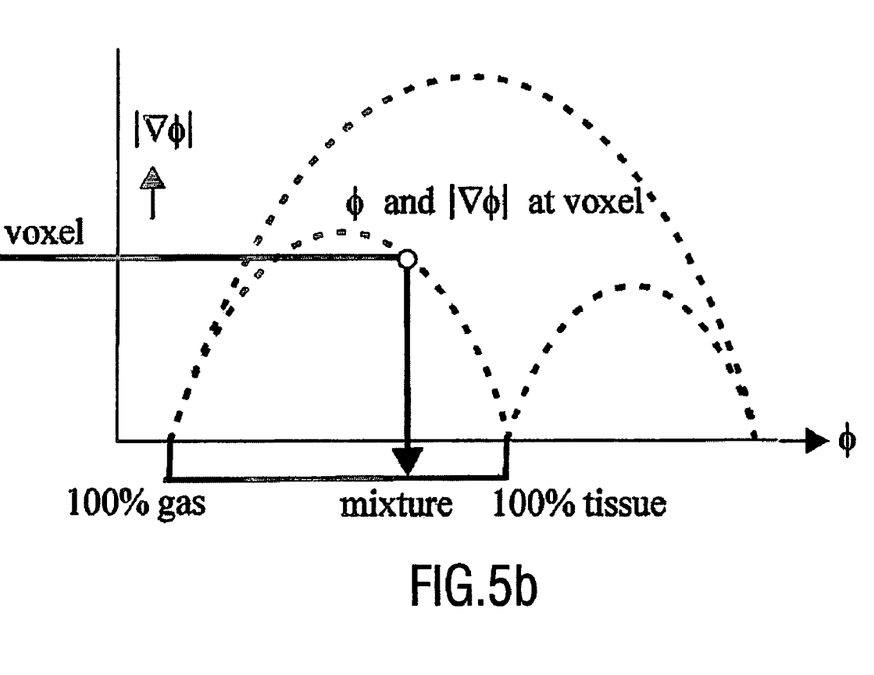

Models for the CT value characteristics for each of the three transitions are now available, which enables us to determine the material contributions per voxel as follows. First, CT measurements φ, |∇φ51 are sampled in the direction of the gradient in the immediate neighborhood of the voxel. The A-curve and position that best fits these local measurements is selected or read off as shown in FIGS. 5a-5b. This enables the exact transition represented by the voxel to be identified.

This two material transition model can be extended further to enable solution of the classification problem of tissue mix at locations where all three material types meet, in this case gas, tissue, and tagged material. The description of the three-material transition model is analogous to the description of the two-material transition model.

Figure 6A:
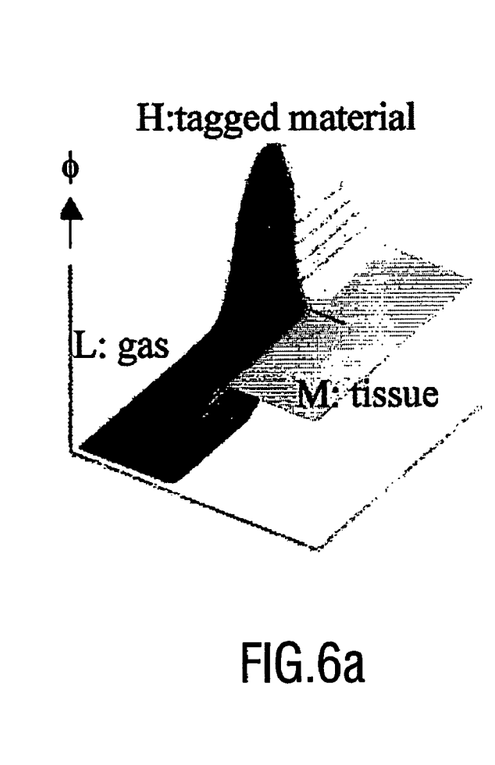
Figure 6B:
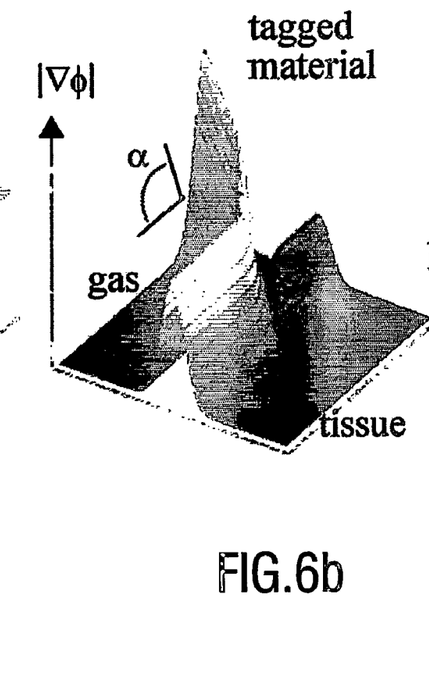
Figure 6C:
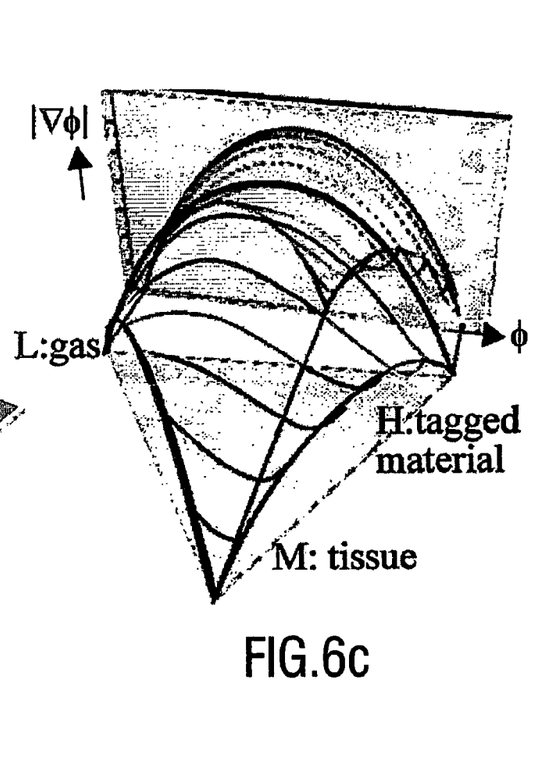

In this case the gas-tagged material transition is modeled to intersect the tissue transition at an angle α. The extended model describes the behavior of the first order derivative, φ', where φ'=|∇φ|, the second order derivative, φ", where φ"=|∇φ'|, and the third order derivative, φ'", where φ'"=|∇φ"|, as functions of the local coordinates x, y, angle α and σ, modeling the PSF. First, the step-edges at the junction are convolved with a Gaussian, σ, shown in FIG. 6a. Each position around the junction corresponds to a material fraction captured by barycentric positions, shown in FIG. 1. Convolving the step-edges at a junction with a Gaussian derivative filter gives the gradient-magnitude shown in FIG. 6b. Plotting the CT gradient-magnitude |∇φ| against barycentric coordinates yields a parachute-shaped surface referred to as the P-surface and shown in FIG. 6c. Much in the same way both φ" and φ'" are determined per barycentric position.

The model is made using a similar method to that already described. The CT values L, M and H, shown in FIG. 6a, corresponding to air, tissue and tagged material, as well as the value σ, are determined using the A-curves as described previously. It can be noted that there are less junctions than edges in the data. The angle is set to 135 degrees roughly matching the adhesive forces at junctions. The tissue mixture in a voxels is determined as before. Principally, CT measurements of φ, φ', φ" and φ'" are sampled in the direction of the gradient in the immediate neighborhood of the voxel. Then, the position at the P-surface that best fits to these local measurements (in a least squares manner) determines the barycentric position.

Using a model of the transition gives us a high robustness to disturbing influences, for example, noise. In addition we need only sample in the immediate neighborhood of the voxel. CT measurements at voxel positions are acquired by convolving with Gaussian kernels and interpolated using cubic spline interpolation. A sufficiently sized value of σ and sample trajectory in the gradient direction makes the method robust to noise. The resolution of significant tissue surface details (set to a diameter ≧5 mm) determines the maximum size of the kernels. Typical values of σ are from 1 to 2 mm and a distance of 0.3 mm in the direction of the gradient.

Thus it is not necessary to sample until we reach the homogenous tissue area This provides us with exceptional advantages. Other methods of calculating tissue mix known in the art rely on different sampling techniques which, in effect, cast their net too wide and draw in voxels from areas in the image which are not immediately adjacent the tissue boundary. This has the disadvantage that those outlying voxels can include intensity grey values from tissue types which do not contribute to the original voxel being tested.

It can be understood that the method as described above gives us information on which type of transition the original voxel was located, or instead, if it was located within uniform tissue. The exact position of the voxel point on the model curve of grey value and gradient magnitude allows us not only to identify which tissues contribute to the voxel, but also what those relative contributions are.

The method of the invention, described here in terms of 3 tissues, can be applied to any number of tissue types depending on how complex the application is.

This method of calculation tissue mix can be applied to segmentation, quantification and visualization where high accuracy is required. Examples of its use include visualization. For example, in a double contrast colon study (air and contrast material is present in the colon), we want to visualize the air-tissue and contrast-tissue boundaries. This is not possible using grey value information alone (e.g. iso-surface rendering), since the grey value cannot distinguish between the 3 tissue transitions. We need to know the tissue mixtures to be able to visualize only the desired transitions. Also, in quantification of lung nodules and tumors, often a threshold-based method is used to distinguish between lesion and non-lesion voxels, and the lesion voxels are counted to determine the volume. The accuracy can be improved by using tissue mixture information, because the voxels near the interface lesion-surrounding will also partially belong to the lesion. This can make a significant difference in small lesions. Further, in segmentation, using mixture densities allows us to use simple techniques like thresholding to achieve sub-voxel accuracies in the segmentation. The result of a segmentation is no longer a binary volume (as is the case with simple thresholding on grey values), but a more fuzzy volume where every voxel contains a value between 0 and 1 representing its tissue density. A pure binary volume (only values 0 and 1 occur) is a special case of this fuzzy volume.

The invention also relates to a computer program arranged to carry out the method, and to a workstation arranged to carry out the method.

This is a novel method of calculating tissue mix which can be used independently of the application to volume visualization.

The invention claimed is:

1. A method to calculate the relative contribution of different tissues to at least one data element in a medical object data set, the medical object data set containing data elements, the method comprising the acts of:
    assigning data values to respective positions of the data elements in a multi-dimensional geometrical space containing more than one tissue,
    calculating parameters for the at least one data element, wherein the parameters are dependent on the data value of the at least one data element and data values of surrounding data elements in the neighborhood of the at least one data element,
    comparing the parameters to combinations of said parameters for boundary data elements in the medical object data set which occur in a region of boundaries between the different tissues, and
    combining the combinations of said parameters for the boundary data elements into a model which represents expected relationships between the parameters near the boundaries.

2. The method of claim 1, wherein for each of the data elements, the parameters include a grey value of that data element and a gradient value along a direction of maximum gradient for that data element.

3. The method of claim 1, wherein the surrounding data elements in the neighborhood of the at least one data element are those data elements which comprise data values representative of a boundary transition between one tissue and another tissue.

4. A computer readable medium embodying a computer program, the computer program when executed by a processor is configured to:
    calculate the relative contribution of different tissues to at least one data element in a medical object data set, the medical object data set containing data elements, the data elements assigning data values to respective positions in a multi-dimensional geometrical space containing more than one tissue,
    calculate parameters for the at least one data element, which parameters are dependent on the data value of the at least one data element and data values of surrounding data elements in the neighborhood of the at least one data element,
    compare the parameters to combinations of said parameters for data elements in the medical object data set which occur in the region of boundaries between tissues, and
    combine the combinations of said parameters for the boundary data elements into a model which represents expected relationships between the parameters near the boundaries.

5. A workstation arranged to calculate the relative contribution of different tissues to at least one data element in a medical object data set, the medical object data set containing data elements, the data elements assigning data values to respective positions in a multi-dimensional geometrical space containing more than one tissue, wherein the workstation is further arranged to calculate parameters for the at least one data element, the parameters being dependent on the data value of the at least one data element and data values of surrounding data elements in the neighborhood of the at least one data element, the workstation being further arranged to compare the parameters to combinations of said parameters for data elements in the medical object data set which occur in the region of boundaries between tissues, and to combine the combinations of said parameters for the boundary data elements into a model which represents expected relationships between the parameters near the boundaries.

6. The method of claim 1, further comprising the act of beginning to sample when a homogenous tissue area is reached.

7. The method of claim 1, further comprising the act of sampling only near the boundaries.

8. The method of claim 1, further comprising the act of classifying a particular data element as belonging to a particular boundary using the model.

9. The method of claim 1, further comprising the act of representing the boundaries as Gaussian smoothed step edges.

10. The method of claim 9, further comprising the acts of:
    plotting values of the data elements and gradient values of the data elements to form arch-shaped curves; and
    defining the arch-shaped curves by curve parameters including two constant values at the Gaussian smoothed step edges for each of the boundaries and a variance of the Gaussian smoothed step edges.

11. The method of claim 10, further comprising the acts of;
    sampling only near the boundaries to obtain samples;
    determining optimal curve parameters that better fit the samples; and
    determining values of the relative contribution of different tissues from the optimal curve parameters.

* * * * *